Feb. 4, 1969  B. B. LIPSKE ETAL  3,425,589
COMPOSITE CONTAINER UNIT
Filed May 31, 1967  Sheet 1 of 3
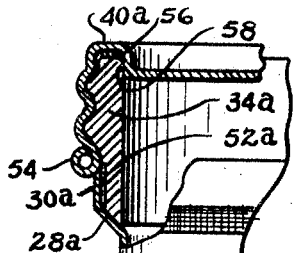
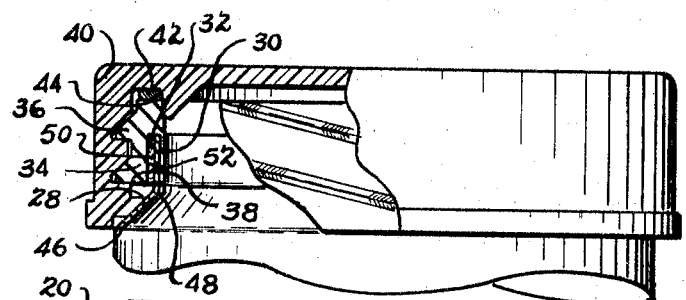
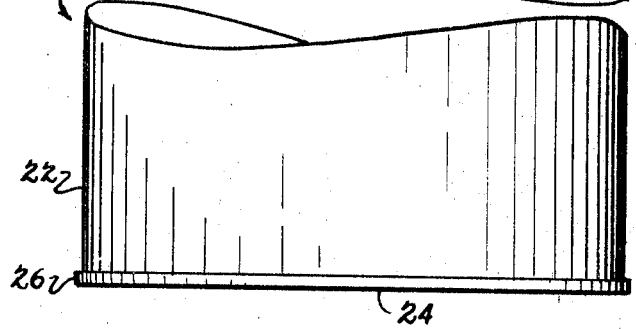
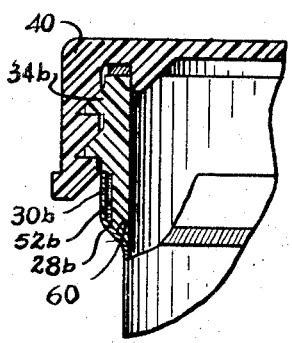
Inventors
BENJAMIN B. LIPSKE,
FRANK W. CONSIDINE and
RICHARD D. ZENGER
BY James J. FitzGibbon
Their Atty

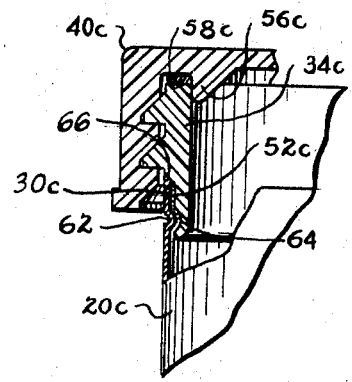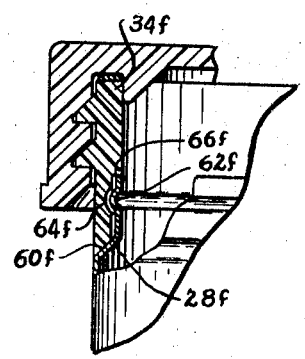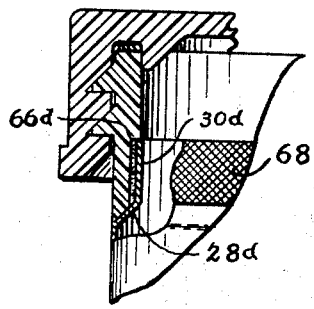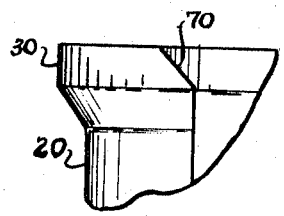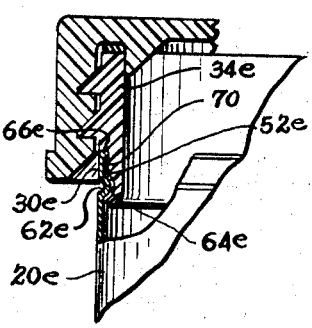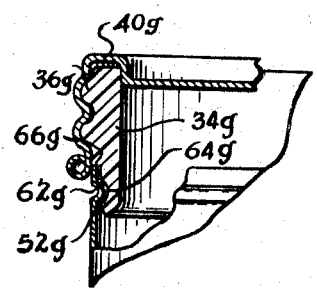

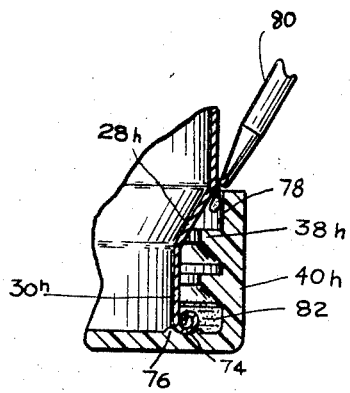
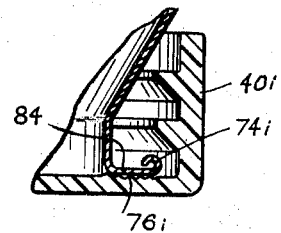
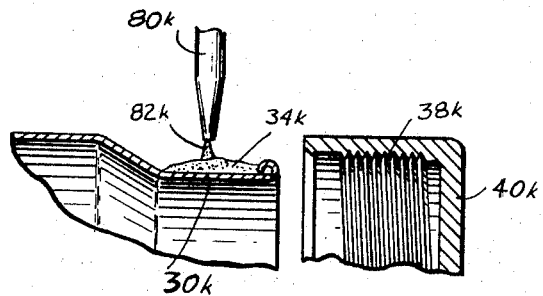
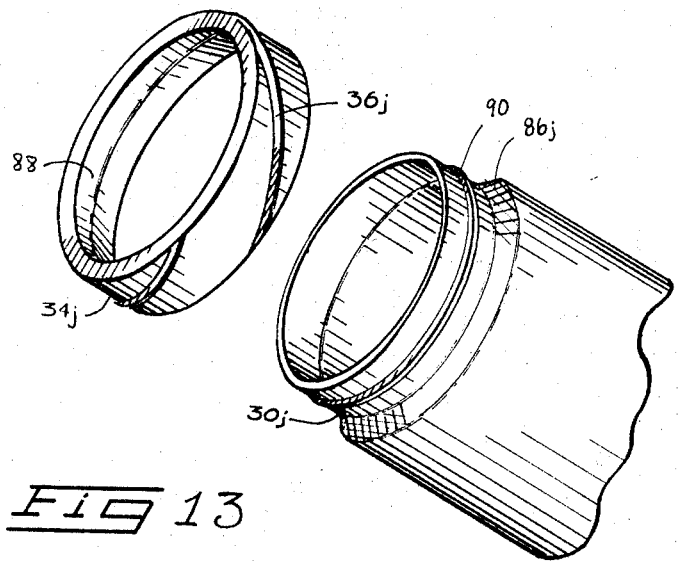

United States Patent Office 3,425,589
Patented Feb. 4, 1969

3,425,589
COMPOSITE CONTAINER UNIT
Benjamin B. Lipske, Downers Grove, Frank W. Considine, Winnetka, and Richard D. Zenger, Downers Grove, Ill., assignors to National Can Corporation, Chicago, Ill., a corporation of Delaware
Filed May 31, 1967, Ser. No. 642,568
U.S. Cl. 220—39　　　　　　　　　　　　　　17 Claims
Int. Cl. B65d 41/08, 7/04

ABSTRACT OF THE DISCLOSURE

A composite container unit in which the body portion and one end wall thereof are of a metal material, and in which the other end unit is a metal or thermoplastic or thermosetting synthetic resinous material, which is removably attached, as by screw threads, to a plastic collar unit which is adhesively secured to the metal can body, and which has corresponding threads or other fastening means thereon.

Various constructions are described, most of which include an adhesive material which as least partially holds the can body to the cover-receiving collar or ring. Several methods of manufacture, including heat-shrinking a collar to the can, and casting a collar in place, with or without threads, are described.

BACKGROUND OF THE INVENTION

Field of the invention

The field of the invention is that of containers with removable and reclosable cover units, particularly in the form of threaded or twist-to-lock closures. The present invention comprises a can with a metal body and a plastic, cover-receiving ring or collar on the top thereof, with a removable plastic or metal cover for attachment to the collar.

Cans made in accordance with the present invention combine the advantages of reclosure and hermetic seal available with a jar, with the advantages of strength, resistance to breaking and other advantages of metal cans. According to the present invention, the cover unit may be plastic or metal, but the collar to which the cover is attached is made of a stiff plastic material.

Description of the prior art

Conventional so-called tin cans and ordinary jars and bottles are will known in the prior art. However, some products require the air tight or vacuum seal which is available from a metal can and many consumers prefer the reclosability feature which is readily available in a jar. However, glass jars are breakable and heavy to ship, and plastic bottles or jars are permeable to gases, and this condition allows gas or vacuum to escape or allows air to enter and damage the product.

Recently, so called plastic overcaps have been available for cans, but, as a practical matter, the seal afforded by such units is not capable of holding pressure or vacuum, and such units often amout to being no more than dust covers. Furthermore, in the case of cans, initial opening requires the use of a can opener or of an expensive built in easy open end of large diameter and marginal reliability.

Recent development in synthetic materials have resulted in the production of new sealing compounds which make the screw on type cover practical for holding pressure or vacuum, but such covers are presently used only with glass jars or bottles, which are unduly massive and require delicate handling and shipping. In the case of relatively expensive products, such as coffee, the cost of the container may be small but, since the container cost is not a factor compared to the potential loss of the product, users of such products have been forced to use a container which is disadvantageous at least in some respects.

Accordingly, there has been a need for a substantial, unbreakable, economical, mass-produced container with a top which is capable of ready removal and replacement and which nevertheless affords a tight seal capable of holding vacuum and pressure.

Accordingly, in view of these problems, an object of the present invention is to provide a metal can unit with a removable metal or plastic cover removably attached to the can body by means of a synthetic resin collar fixedly attached to the can body by means which may include an adhesive.

Another object is to provide a container with a somewhat conventional screw-on top cover which may be easily opened and which is relatively unbreakable.

SUMMARY OF THE INVENTION

The present invention achieves these objects, and other objects inherent therein and overcomes the problems of the prior art by providing a can unit with a conventional metal body, and upper flange or neck portion including a sealing surface, adhesive means on the sealing surface, a plastic cover-receiving ring or collar with an inner, mating sealing surface and outer cap-engaging means, and a metal or plastic exterior cover removably attached to the collar. A sealing gasket or the like may also be provided for the seal between the collar and the cover.

These and other objects and advantages of the present invention, including those inherent therein, and the manner of their attainment, will become more apparent when considered in conjunction with a description of the preferred embodiments of the invention contained in the following specification and claims, and as shown in the drawings below, in which like reference numerals denote corresponding parts throughout.

BRIEF DESCRIPTION OF THE DRAWINGS

FIG. 1 is a side elevational view, partly in section and with portions broken away, showing a composite can unit of the present invention.

FIG. 2 is a vertical sectional view, with portions broken away, showing another embodiment of the present invention.

FIGS. 3 through 8 are enlarged sectional views of differing embodiments of the present invention, particularly showing the various methods of attaching a cover receiving collar to a can body unit.

FIG. 9 is a side elevational view, with portions broken away, showing a portion of a side seam of the can body portion of the invention.

FIG. 10 is a vertical sectional view, with portions broken away, illustrating a method of manufacturing a container unit of the present invention.

FIG. 11 is a sectional view, with portions broken away, of a different embodiment of the neck and cover unit shown in FIG. 10.

FIG. 12 is a vertical sectional view of a method of making one embodiment of the present invention.

FIG. 13 is an exploded isometric view illustrating a process of making the container of the present invention.

Before referring to the invention in greater detail, it will be understood that when the words "upper," "lower," "inner," "outer," etc., are used, these words denote the relations of parts when the can is in a normal position of use, such as that shown in FIG. 1, wherein the cover unit is on the top of the can.

Referring now to the drawings in greater detail, a unit 20 is illustrated in FIG. 1, in which vertical side walls 22 are attached to a bottom cover 24 by means of a conventional double seam 26 which is well known in the art. An inwardly, angularly extending offset shoulder 28 separates a smaller diameter neck 30 from the side wall 22 of the container 20. A band of adhesive 32, to be fully described later, securely holds a cover receiving collar 34 adjacent the neck 30 in a mechanically locked position and forms an air tight seal therewith. Threads 36 are formed in the collar 34 to engage corresponding inner threads 38 formed on the cover unit 40. A rubber or rubber-like seal 42 is disposed in an annulus 44 which is formed in the cover 40.

In this embodiment, the collar 34 is securely locked to the neck 30 and thus to the body 22. Thus, the cover 40, may be applied and removed in the same manner as though the container 20 were a glass or plastic jar. In this embodiment, the shoulder 28 is joined to the body 22 by a shoulder radius 46 and the neck 30 to the shoulder 28 by a neck radius 48. In this embodiment, the combination of the neck radius 48 and the neck-receiving slot 50 combine to locate the collar 34 in a desired fixed vertical position.

In this embodiment, the outer surface of the neck 30 and the inner surface of the neck slot 50 are secured to each other by a layer of adhesive material 52. The adhesive 52 is preferably first applied to the can, and thereafter the collar 34 is applied, whereupon the adhesive 52 is allowed to set.

FIG. 2 shows another embodiment of the invention, in which the cover 40a is metal, the threads 36a are relatively rounded and the shoulder 28a extends outwardly and terminates in a large diameter neck 30a. The lower edge of the cap 40a is in a form of a rolled bead 54. The inner surface of the neck 30a contains an adhesive bead 52a contacting the inner surface of the collar 34a. In this embodiment, the inherent flexibility of the collar 34a does away with the need for a gasket, and the combination of horizontal and vertical cap sealing surfaces 56, 58 provide a sufficiently tight seal so that the gasket is not necessary.

FIG. 3 shows a construction in which the shoulder 28b extends outwardly and terminates in a larger diameter neck 30b, but in this embodiment the cover 40b is similar to the one shown in FIG. 1. The location of the adhesive bead 52b is on the inside surface of the neck 30b, and a lower frusto-conical edge 60 of the collar 34b abuts the shoulder 28b.

FIG. 4 illustrates an embodiment in which a bead 62 separates the can body 20c from the upper neck or sealing surface 30c. In this embodiment, a corresponding cut out or notch 64 is provided to mate with the inner surface of the bead 62. The layer of adhesive 52c attaches the collar 34c to the can body 20c. Vertical location of the ring 34c is accomplished not only by a fit of the bead 62 and the notch 64, but also by a shoulder 66 which extends outwardly near the bottom portion of the collar 34c. The cover 40c contains horizontal and vertical sealing surfaces 56c, 58c, similar to those shown on the metal cover 40a shown in FIG. 2. The use of a gasket, such as that shown in FIG. 1, is optional in this case, depending on the material from which the collar and cover 34c, and 40c are made.

The embodiment shown on FIG. 5 is similar to that shown in FIG. 1, except that a roughened or knurled outer surface 68 is placed on the neck 30d which surmounts the shoulder 28d. This roughened or knurled surface 68 may be mechanically abraded, as by brushing, chemically treated, or mechanically embossed by means of a knurling die or the like, facilitates a locking action between the neck 30d and the collar 34d. In this construction, an inwardly extending shoulder 66d is provided to engage the neck surface 30d.

FIG. 6 shows a construction in which a bead 62e and a corresponding notch 64e are provided for locating the collar 34e in a desired position at the top of the neck 30e. An inwardly turned flange 70 is provided for engaging the shoulder 66e of the collar 34e, and for defining, in combination with the bead 62e, a channel for the adhesive 52e.

In this embodiment, a relatively viscous adhesive may be deposited in this channel as the can is rotated beneath a nozzle, for example, and the adhesive may be adequately distributed and held in a desired position for fastening the collar 34e to the neck 30e.

FIG. 7 shows a construction combining the bead 62f and the notch 64f with a sloping collar shoulder 60f adjoining the can shoulder 28f. An inwardly extending locating shoulder 66f is provided on the collar 34f. In this case an exterior channel means for the adhesive 52f is provided between the shoulder 28f and the bead 64f, which aids in locating the adhesive 52f (not shown).

FIG. 8 shows an embodiment in which a bead 62g and a notch 64g, in addition to the shoulder 66g, locate a collar 34g, having rounded threads 36g thereon. An adhesive 52g locates and maintains the collar 34g in place. In this case, a metal cover 40g is shown, and this cover may be used with or without a gasket, depending on the composition of the collar 34g.

In the illustrations herein, relatively rounded threads are shown associated with metal caps, and relatively angular threads are shown used with plastic caps. However, any known combination of threads may be used, since the exact design of the threads does not constitute a feature of the invention which is novel per se.

The materials used in making containers according to the present invention will now be discussed.

The can body unit, 20, to which the collar and cover unit are attached, may be a conventional cylindrical metal container of the "tin can" type. For example, the can body may be made from tin plated steel, with a conventional soldered side seam construction. This construction is used in most sanitary cans for food products, for beer and beverage cans and the like. When such a can body is used in the present invention, however, if the neck 30 is going to be of a larger or smaller diameter than the body 20, as shown, for example, in FIGS. 1 and 2, the diagonal length of the notch 70 (FIG. 9) is somewhat longer because of the requirement that the neck 30 be offset from the body 20. Thus, this notch, in a can body used in the present invention, might be as much as ⅜ of an inch or longer, as contrasted to ³⁄₁₆ of an inch, in an ordinary can body.

The collar and cover units of the present invention may be used with tinplate or so called "tin free" steel bodies in which a side seam is overlapped and welded, butt welded, lock seamed and soldered, or overlapped and adhesively secured, as by a polyamide adhesive.

Likewise, can bodies for use in the present invention may be made from deep drawn aluminum or steel, or may be made with one or more redraws with or without the addition of an ironing step to smooth and strengthen the container thus formed.

In addition, extruded can bodies are becoming more common, and are suited for use with the present invention. These bodies are normally made from aluminum slugs, which are struck with a great impact, forcing the metal through extrustion die and thus forming a body.

After a drawn or extruded body is formed, the various flanges, beads or necks may be imparted to the body by a rolling operation. Likewise, bodies with ordinary side seams may have beads, shoulders or necks imparted thereto by rolling or other means conventional in the can industry.

The cover units 34 are preferably made of plastic, and are preferably so designed that sufficient strength against radial distortion is provided to withstand the forces imposed by twisting and unlocking the cover from the ring. The type of plastic selected, the degree of cross-linking thereof, and other factors, as well as size of the can body, determine the desired thicknesses. Thus, for example, cover elements may be made from polyetheylene, polypropylene, polystyrene, various phenolics, epoxies, phenoxies, nylon, (polyamides), polyvinyl chloride, melamine-, urea- or other formaldehyde resins, acetals, polycarbonates, or the like.

Normaly, these cover units are injection molded or cast, so that threads, neck slots, and the like, may be integrally formed therein. In a typical embodiment, a collar of polypropylene on a can of about 3 inches diameter and a height of 4 inches has about the same thickness of about 0.060 inch, and a cover having about the same thickness is provided therefor. Upon applying the cover to the collar and screwing it into position with firm manual force, a seal which will hold pressure and vacuum is made possible. In this case, no gasket was used. This selection of the palstic for the collar and cover is therefore made according to various criteria, but is well known that polyethyelene is somewhat soft, polystyrene is somewhat brittle, melamine plastics are expensive and some plastics have relatively poor adhesive characteristics. On the other hand, to obtain a relatively satisfactory seal, a certain amount of resilience and freedom from creep or cold flow is desired. Under these conditions, it is sometimes desirable to use combination or interpolymer plastics, such as ABS (acrylonitrile-butadiene-styrene) or to use plasticizers or modifiers from the other resins. Because of the sealing characteristics required, it is often desired to make the cover and the ring from different materials.

Although the materials named above are useful in the present invention, the invention is not strictly limited to these materials only, and the materials themselves are not the essence of the invention or novel per se. Selection of materials, according to the criteria set forth above, however can readily be made by those skilled in the art.

For example, an elaborate summary of the characteristics and uses of polypropolene screw-on type covers is set forth in a booklet entitled, "Linerless Polypropylene Closures—Packaging Monograph No. 2" by Richard J. Pechna, published by The Packaging Institute, New York, N.Y., in June 1964. This work also sets forth the characteristics of the threads and sealing ribs of different style closures.

Referring now to the adhesives used in the present invention, the requirements are that, in the case of a food product, the adhesive be F.D.A. approved, that it be compatible with the product, if a chemical reaction therebetween is likely, and that it adheres strongly to the can body, or to any primers or coatings thereon, and to the cover collar be impermeable to passage of air or other gas, and be unaffected by pressure or vacuum, in accordance with the intended use.

Accordingly, it is common to use a thermosetting or two-component adhesive system, such as an amide- or amine-cured epoxy resin system, or a system in which two single-composition adhesives are used, one of which adheres to metal substrate and to the second adhesive, and the second of which adheres to a plastic, such as polyethyelene, and to the first adhesive. Such adhesives are becoming more common and are well known to those skilled in the art. One such system is produced by Hercules Powder Company, and comprises a primer which is strongly adherent to tin-plate or tin-free steel, or the normal primers used thereon, and the other of which reacts with and bonds to polyethylene and to the primer. These adhesives are presently sold under the marks "Herco-Prime" and "Herco-Tuf," respectively. Such a system is ordinarily used if the plastic ring is made from polyetheylene. Although it is difficult to secure adhesives for many olefin plastics, adhesives for polyethylene are available, and such adhesives, and other known adhesives, function satisfactorily with polypropylene, which is inexpenseive and for which it is easy to obtain satisfactory adhesives. Likewise, both emulsion and solvent type vinyl resins, such as those which dissolve in ketone solvents, will bond many common plastics. Amide or nylon type adhesives are also strong and bond well to vinyl or like primers and to resins of similar makeup which are used in making the cover-receiving collar.

The compound used for the gasket 42 can be of the type used with crown caps for bottles, namely, cork or polyethylene, or the type used with food products, such as the lubricated vinyl chloride type of modified resins described in the Unger et al. U.S. Patent No. 2,874,863, issued Feb. 24, 1959.

Making containers described in the present invention may be accomplished by conventional means, namely disposing the adhesive in liquid or semi-liquid ribbon form, in a channel or bead near the top edge of the can body portion. In addition, adhesives may be applied to the body, or the neck or shoulder portions thereof, as well as to the cover-receiving collar, by spraying, roll coating, dipping, or the like. Such methods are conventional and well known in the can industry and similar arts.

However, applicant has discovered additional methods for manufacturing containers of the type described herein.

The first method is illustrated in FIGS. 10 and 11, in which a portion of the can body 20h includes an inwardly tapering shoulder 28h and terminates in a curled sealing bead 74. A plastic cover unit 40h includes small sealing ribs 76 which engage the bead 74 to form a liquid tight seal. A release coating 78 covers the inside surface, including the threads 38h of that portion of the cover 40h which lies radially outside the bead 74.

A nozzle unit 80 deposits a liquid plastic material 82 inside the cover 40h in the space between the outside of the shoulder 28h and the neck 30h of the container body, and the inside of the cover 40h. The plastic material 82 is one which adheres to the can body or to the primers placed thereon, and upon curing or cooling, forms a collar unit which is attached to the body and in which threads formd which are complementary to the threads 38h and the cover 40h. If the cover 40h is made of a material, such as polyethylene or polypropylene, which does not adhere to the plastic 82, such as a vinyl, which comprises the collar, the release coating 78 is therefore not necessary.

As shown in FIG. 11, there may be a number of sealing ribs 76i adapted to engage a flange 84 which extends inwardly of the curl 74i.

FIG. 12 illustrates another embodiment of the invention in which a thick viscous ribbon of plastic material 86 is deposited onto the neck 30k of a can body from a nozzle 80k. The plastic material 86 is preferably a material which will adhere to the can body and which can be cured into a firm but resilient or rubbery ring, as by the application of heat, but which is not hard or brittle. In this case, after the plastic 86 has solidified, a cover 40k utilizing sharp, fine inwardly directed cut threads 38k, is placed against the plastic collar 34k and rotated. The threads 38k are self tapping and the cover thus screws on over the collar without cutting any material therefrom.

This construction may be used where the contents may be emptied or used at one time, and therefore, although the cap may not readily reseal, it forms an excellent air tight seal when it is first applied and may be readily removed. Threads such as those shown in 38k are well known and used, particularly in the drug industry, for example. The plastic material 86 is preferably a vinyl chloride plastic, but other rubber-like resinous materials will also operate satisfactorily.

Another method which can be used for making containers according to the present invention, is suitable for use where it is not strictly necessary that the seal include an adhesive material. Thus, in FIG. 13, a method is shown in which a cover-receiving collar 34j is placed over a can body which includes rotation preventing means in the form of a knurled surface 86j, as well as a relatively smooth sealing surface 88, containing, for example, a single bead 90.

The collar 34j illustrated herein is made from a biaxially oriented thermoplastic material such as polypropylene. This collar sized so as to fit almost snugly over the neck 30j but with a fit which is free enough to allow ready passage thereover. After the collar 34j is placed in position, it is exposed to heat, whereupon the uniform shrinkage of the material locks the ring in place over the neck of the can, with the knurled surface 86 providing resistance to rotation, the sealing surface 88 providing a seal, and a bead 90 preventing undesired vertical movement.

The collar 34j which shrinks uniformly inwardly upon the application of heat, locks itself over the bead 90 since the collar 34j, although quite rigid, is still flexible enough to conform to the contours of the bead 90. Likewise, the knurled surface 86 provides additional mechanical interlocking, which serves to prevent rotation of the collar 34j about the can body.

Although collars made according to the present invention need not be made from material which is extremely stiff, considerable stiffness against bending is added to the neck of the can by the addition of the plastic collar unit. In this manner, the caps may be twisted tightly enough to obtain a firm lock on the collar, without deflecting the neck portion of the can from its substantially round or cylindrical shape.

All metal cans with metal lids are common in the prior art and are useful for many purposes, but when made with the thin metals which are common in the can making industry today, the neck portions of these cans lack substantial stiffness or bending strength, whereas cans made according to the present invention are very stiff in this area, owing to the reinforcing which is provided by the plastic collar element. When the cover is in place, additional stiffness is provided, even if the cover itself is not of an extremely stiff material, since its section modulus is fairly high because of the cap or cover configuration.

Although containers made according to the present invention may lack the ultimate yield strength of cans made from heavier gauge metals throughout, they are very satisfactory for holding food and like products under conditions of moderate pressure or vacuum. Thus, according to the present invention, a container unit is provided which has the easy opening and reclosability characteristics of a plastic or glass jar, and the strength against breakage of a metal can, and combines these features and advantages at a reasonable cost.

We claim:
1. A composite container unit comprising, in combination,
   (a) A metal body portion, including side walls, a bottom end wall, and an upper neck portion,
   (b) means located on said upper neck portion for locating a synthetic resinous plastic cover-receiving collar thereon,
   (c) means for preventing rotation of said collar relative to said body portion,
   (d) first thread means formed on said collar for receiving and retaining a cover member,
   (e) a cover member having second thread means thereon, said means being complementary to said first thread means, for locating said cover on said collar units, and
   (f) said means for preventing rotation of said collar comprising a synthetic resinous adhesive material.

2. A composite container unit as defined in claim 1 which further includes an inwardly extending shoulder formed in the top of said body portion joining said side walls to said neck portions, said neck portion being smaller in diameter than the remainder of said metal body portion.

3. A composite container unit as defined in claim 1 in which said means for locating said collar comprises an outwardly directed bead formed in a top portion of said container body, and in which said collar includes a notch adapted to receive said bead.

4. A composite container unit as defined in claim 1 in which said means for locating said collar comprises an inwardly directed bead formed in the top portion of said container body, and in which said collar includes a notch adapted to receive said bead.

5. A composite container unit as defined in claim 1 which further includes means in the form of a vertically extending slot in said collar for receiving the neck portion of said body portion.

6. A composite container unit comprising, in combination,
   (a) A metal body portion, including side walls, a bottom end wall, and an upper neck portion,
   (b) means located on said upper neck portion for locating a synthetic resinous plastic cover-receiving collar thereon,
   (c) means for preventing rotation of said collar relative to said body portion,
   (d) first thread means formed on said collar for receiving and retaining a cover member,
   (e) a cover member having second thread means thereon, said means being complementary to said first thread means, for locating said cover on said collar units, and
   (f) said means for locating said collar relative to said body portion comprising an outwardly extending shoulder formed in the top of said body portion surmounted by a neck portion larger in diameter than said metal body portion, said shoulder and said neck being integrally formed with said body portion.

7. A composite container unit comprising, in combination,
   (a) A metal body portion, including side walls, a bottom end wall, and an upper neck portion,
   (b) means located on said upper neck portion for locating a synthetic resinous plastic cover-receiving collar thereon,
   (c) means for preventing rotation of said collar relative to said body portion,
   (d) first thread means formed on said collar for receiving and retaining a cover member,
   (e) a cover member having second thread means thereon, said means being complementary to said first thread means, for locating said cover on said collar units, and
   (f) said means for preventing rotation of said collar comprising a synthetic resinous adhesive material, and further including a knurled surface on an upper portion of said body portion adapted to mechanically engage said collar unit.

8. A composite container unit as defined in claim 7 which further includes an inwardly extending shoulder formed in the top of said body portion joining said side walls to said neck portions, said neck portion being smaller in diameter than the remainder of said metal body portion.

9. A composite container unit as defined in claim 7 in which said means for locating said collar comprises an outwardly directed bead formed in a top portion of said container body, and in which said collar includes a notch adapted to receive said bend.

10. A composite container unit as defined in claim 7 in which said means for locating said collar comprises an inwardly directed bead formed in the top portion of said container body, and in which said collar includes a notch adapted to receive said bead.

11. A composite container unit as defined in claim 7 which further includes means in the form of a vertically extending slot in said collar for receiving the neck portion of said body portion.

12. A method of making a composite container unit, comprising,
   (a) forming a metal body portion for said container, said body portion including side walls, a bottom end wall and an upper neck portion,
   (b) forming top flange means on the neck portion of said container body,
   (c) providing a cover having an interior side wall portion having inwardly extending threads thereon, said cover being sized so as to provide a space between the interior side wall portions thereof and the neck portion of said can body when said cover is centrally located with respect to said can body, (d) positioning said cover centrally of and over the end of said can body, with the interior top surface of said cover contacting said flange means in a liquid-tight relation, and, while holding said cover and said can body in such position, (e) filling said space between said threads and said neck portion with a liquid plastic material which is adherent to said neck portion of said can body and relatively non-adherent to the interior portions of said cover unit, and holding said cover unit in position until said plastic material has achieved a self supporting consistency.

13. A method of making a composite container unit as defined in claim 12 which additionally includes providing a plurality of sealing ribs on the interior top surface of said cover unit for contacting said flange and providing a liquid tight seal therewith.

14. A method of making a composite container unit comprising;

(a) providing a container body including side walls, a bottom end wall and an upper neck portion, (b) depositing a ribbon of a viscous plastic material, which when cured, becomes stiff but resilient, (c) allowing said ribbon to cure to form a substantially solid collar attached to and surrounding said neck portion of said container body, (d) providing a metal cover unit which includes a plurality of closely spaced sharp threads on the interior side wall portions of said cover, and (e) moving said cover to a position so that said threads contact said collar, and rotating said body and said cover relative to each other to form threads in said collar corresponding to said threads on said cover, and simultaneously advancing said cover to a closed position over the end of said container body, whereby said sets of threads engage each other to hold said cover over said collar in an air tight relation.

15. A method of making a composite container unit as set forth in claim 14 in which said material comprises a vinyl plastisol material.

16. A method of making a composite container unit comprising;

(a) providing a metal body portion including side walls, a bottom end wall and an upper neck portion, (b) providing a synthetic resinous cover-receiving collar member adapted to fit over said neck portion of said container body, said collar being made from a biaxially oriented, heat-shrinkable plastic material, (c) providing bead means in said neck portion of said container for engaging said collar to prevent removal thereof from said container, (d) placing said collar over said neck portion with said bead means in position to engage the inside surface of said collar, and (e) applying heat to shrink said collar over said neck portion, thereby fastening said collar to said neck in a liquid-tight relation.

17. The method of making a container as set forth in claim 16 which includes the further step of providing a knurled surface on said container body portion for mechanically engaging and interlocking the inside surface of said cover-receiving collar with said neck portion of said body.

References Cited

UNITED STATES PATENTS

| 2,916,311 | 12/1959 | Keplinger | 220—39 |
| 3,071,281 | 1/1963 | Sawai | 220—39 |

FOREIGN PATENTS

| 196,105 | 6/1937 | Switzerland. |

JAMES B. MARBERT, *Primary Examiner.*